W. H. SAUVAGE.
PRESSURE INDICATOR.
APPLICATION FILED JUNE 25, 1912.
1,106,681.
Patented Aug. 11, 1914.
2 SHEETS—SHEET 1.
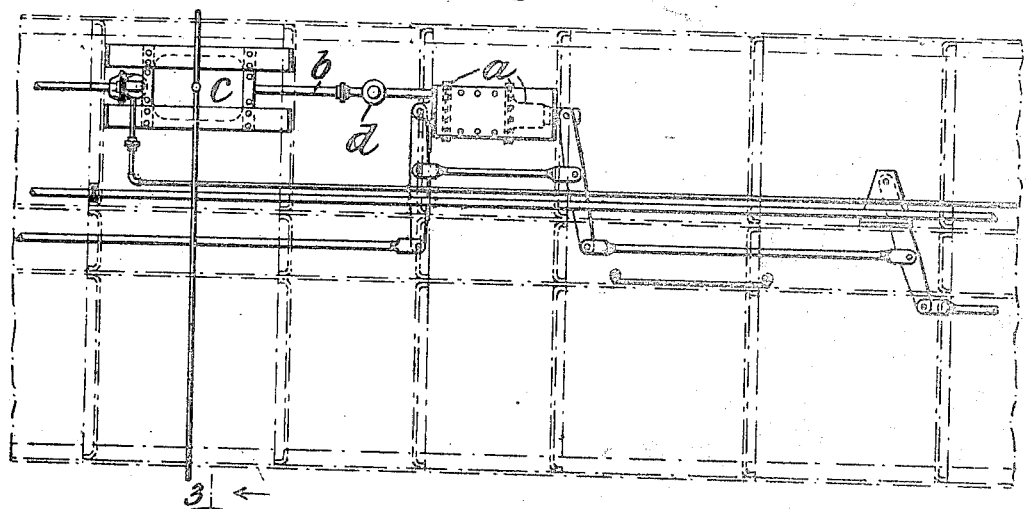
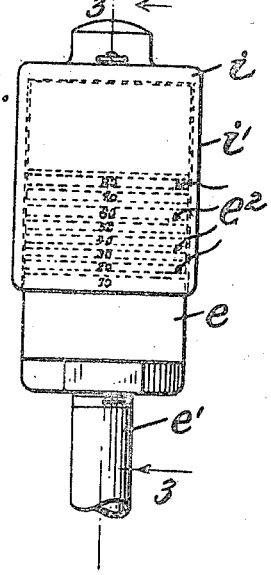
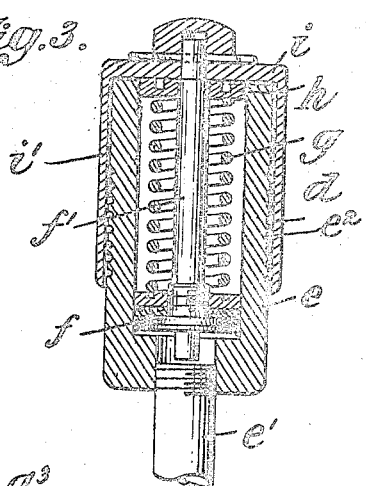
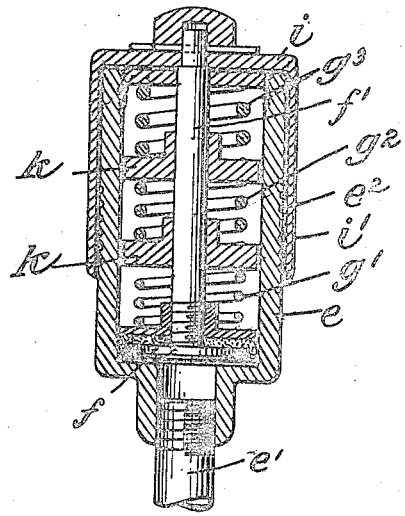
Attest:
W. M. Flynn
Worthington Campbell
Inventor:
William H. Sauvage
by Redding & Greeley
Attys.

W. H. SAUVAGE.
PRESSURE INDICATOR.
APPLICATION FILED JUNE 25, 1912.

1,106,681.

Patented Aug. 11, 1914.
2 SHEETS—SHEET 2.

UNITED STATES PATENT OFFICE.

WILLIAM H. SAUVAGE, OF NEW YORK, N. Y., ASSIGNOR TO SAUVAGE-WARD BRAKE COMPANY, INC., A CORPORATION OF DELAWARE.

PRESSURE-INDICATOR.

1,106,681.   Specification of Letters Patent.   Patented Aug. 11, 1914.

Application filed June 25, 1912. Serial No. 705,764.

*To all whom it may concern:*

Be it known that I, WILLIAM H. SAUVAGE, a citizen of the United States, residing in the borough of Manhattan of the city of New York, State of New York, have invented certain new and useful Improvements in Pressure-Indicators, of which the following is a specification, reference being had to the accompanying drawings, which form a part hereof.

This invention relates particularly to the construction of pressure indicators for use in connection with fluid pressure brake systems on railway cars and for other uses in which the pressure indicator is exposed to the danger of being stolen, by reason of its value for other purposes, to danger of being broken by flying pieces of ballast, etc., and to the certainty of being so obscured by dust, snow or ice as to be unreadable.

The object of the invention is to provide a pressure indicator which is not likely to be stolen, is not likely to be broken, and is not likely to be rendered illegible by dust.

In accordance with the invention the indicator is strongly constructed without glass being broken by flying stones and with the indicating scale normally covered and exposed only by relative movement of the scale and the inclosing part.

The invention will be more fully explained hereinafter with reference to the accompanying drawings in which it is illustrated and in which—

Figure 5:
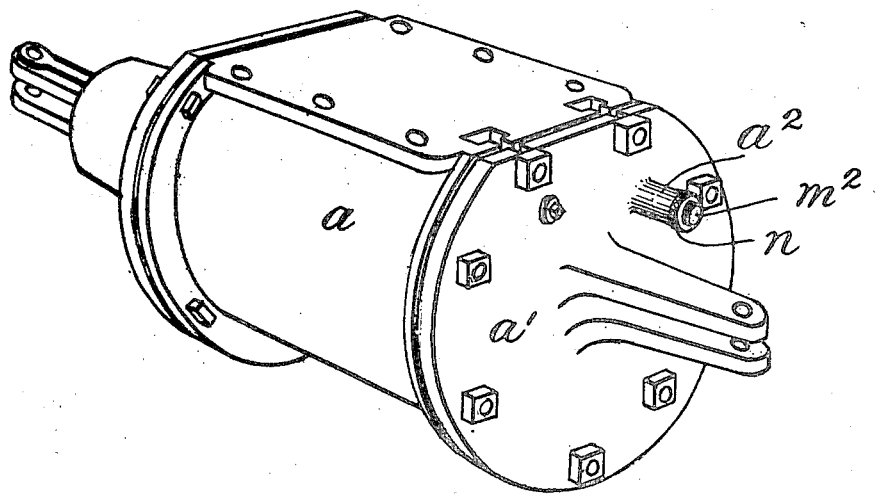
Figure 6:
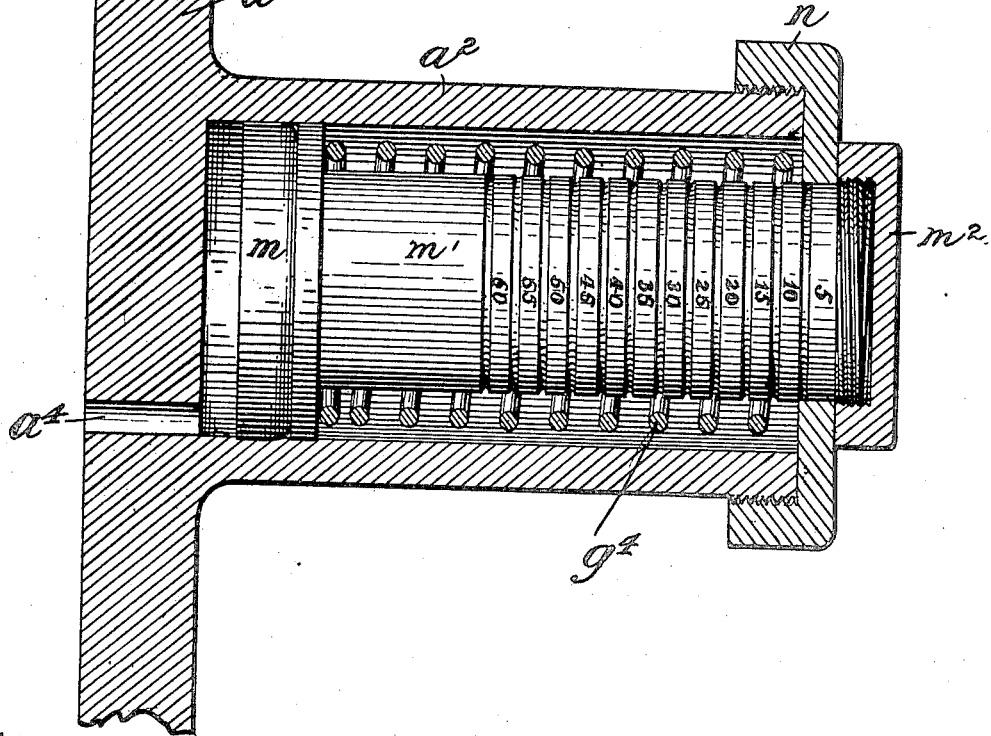

Figure 1 is a top view of a portion of a fluid pressure brake system sufficient to illustrate the application of the invention thereto, the car body being indicated by dotted lines. Fig. 2 is a view in elevation of the pressure indicator. Fig. 3 is a detail view in section on the plane indicated by the line 3—3 of Fig. 2. Fig. 4 is a view similar to Fig. 3 but showing a slightly different internal construction. Fig. 5 is a view illustrating the application of the indicator directly to the brake cylinder. Fig. 6 is a detail view in section, on a larger scale, of the indicator shown in Fig. 5.

In the construction represented in Fig. 1 the usual brake cylinder $a$, shown chiefly in dotted lines, is connected, as usual, by a pipe $b$, to the auxiliary reservoir $c$ and thence with the rest of the brake system. On the brake cylinder or auxiliary reservoir or any convenient point in the connection between them is located the indicator $d$ by which the pressure at any time may be determined. In the form of the indicator shown in Figs. 2 and 3, a short cylinder or casing $e$ is connected, as indicated at $e'$, to the line in which the pressure is to be determined, and as marked on its exterior, has at $e^2$ (shown in dotted lines in Fig. 2), a reading scale, preferably by rather deep grooves formed circumferentially about the cylinder. Within the cylinder is a piston $f$ which is subject to the pressure of a spring $g$. The latter abuts against a screw plug $h$ in the end of the cylinder. The stem or rod $f'$ of the piston is extended through the screw plug $h$ and carries a cap $i$ which has a depending flange $i'$ surrounding the cylinder $e$ and covering and protecting the scale $e^2$ thereon. The pressure of the air against the piston $f$ moves it against the resistance of the spring $f'$ and the degree of the pressure is indicated by the lower edge or end of the flange $i'$ on the scale $e^2$. It will be noted that all of the parts are reasonably heavy and strongly constructed and especially that the scale is covered by the flange $i'$ of the cap $i$ and is thereby protected against obliteration by dust and dirt. Not only does the cap cover the scale when there is no pressure in the cylinder, but as it returns to normal position after having been displaced it rubs off such dust as may have accumulated on the scale while it was exposed. It is therefore easy at all times to obtain a reading of the scale.

In the embodiment of the invention shown in Fig. 4 the construction is substantially the same as that already described, the cylinder $e$ being connected through a pipe $e'$ with the brake system and having a scale $e^2$ formed on its exterior. The piston $f$ is likewise connected by its stem or rod $f'$ with a cap $i$ which has a depending flange $i'$ to cover the scale. In this case, however, in place of a single compression spring, there are provided a series of springs $g^1$, $g^2$ and $g^3$, successively heavier. Between the spring $g^1$ and the spring $g^2$ and between the spring $g^2$ and the spring $g^3$ are placed loose washers $k$. In the operation of this form of the indicator the springs $g^1$, $g^2$ and $g^3$ are successively compressed by the increasing pressure.

In the embodiment of the invention shown in Figs. 5 and 6 the indicator is formed in part with the head $a'$ of the brake cylinder $a$, so that the indicator forms a part of the brake cylinder and is manufactured and sold therewith. The construction of the indicator, in this case differs somewhat from that shown in Figs. 3 and 4. In this case the cylinder $a^2$ is formed as an integral part of the brake cylinder head $a'$ and is bored out interiorly and connected directly with the interior of the cylinder by the channel $a^4$. The piston $m$ acts against a suitable resistance spring $g^4$ substantially as in the construction shown in Figs. 3 and 4. A cap $n$ threaded upon the cylinder $a^2$, furnishes an abutment for the spring. The stem or rod $m'$ of the piston passes freely through the cap $n$ and may be provided outside of the cap with a dust guard or ring $m^2$. In this case, the scale $m^3$ is formed on the piston rod or stem. It is protected by the cylinder itself and is exposed by relative movement of the piston with respect to the cylinder.

Various other embodiments of the invention will suggest themselves to suit different conditions of use.

I claim as my invention:—

A pressure indicator which comprises a cylinder in communication at one end with the source of air pressure and provided on its outer periphery with a series of circumferential grooves constituting a reading scale, a piston within the cylinder subject on one side to the pressure of the air, a spiral spring in operative engagement with the other side of the piston, a plug threaded removably into the open end of the cylinder and constituting a seat for said spring whereby the spring and the piston are entirely incased, and a slidable cap in snug engagement with the outer walls of the cylinder and adapted normally to cover the reading scale, the stem of the piston extending through an aperture in the removable plug and being fastened to the cap whereby upon movement of the piston under air pressure the cap is moved correspondingly and its lower edge passes over the grooves of the reading scale to uncover the same and indicate the pressure acting against the piston, the spring serving to restore the piston and the cap to their normal positions when the piston is relieved from the pressure of the air, the edge of the cap on such return movement serving to remove all foreign substances from the reading scale.

This specification signed and witnessed this 20th day of June A. D., 1912.

WILLIAM H. SAUVAGE.

Signed in the presence of—
E. M. TAYLOR,
WORTHINGTON CAMPBELL.